United States Patent
Holt et al.

(10) Patent No.: US 9,720,606 B2
(45) Date of Patent: Aug. 1, 2017

(54) METHODS AND STRUCTURE FOR ONLINE MIGRATION OF DATA IN STORAGE SYSTEMS COMPRISING A PLURALITY OF STORAGE DEVICES

(75) Inventors: Keith W. Holt, Wichita, KS (US); John G. Logan, Long Beach, CA (US); Kevin Kidney, Lafayette, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 909 days.

(21) Appl. No.: 12/912,416

(22) Filed: Oct. 26, 2010

(65) Prior Publication Data

US 2012/0102286 A1    Apr. 26, 2012

(51) Int. Cl.
G06F 12/00 (2006.01)
G06F 3/06 (2006.01)

(52) U.S. Cl.
CPC .......... *G06F 3/0617* (2013.01); *G06F 3/0647* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 5,423,046 A | 6/1995 | Nunnelley et al. | |
| 5,796,633 A | 8/1998 | Burgess et al. | |
| 6,269,433 B1 | 7/2001 | Jones et al. | |
| 6,314,503 B1 | 11/2001 | D'Errico et al. | |
| 6,718,436 B2 | 4/2004 | Kim et al. | |
| 6,895,485 B1 | 5/2005 | DeKoning et al. | |
| 7,360,017 B2 | 4/2008 | Higaki et al. | |
| 7,516,348 B1 | 4/2009 | Ofer | |
| 8,060,759 B1 | 11/2011 | Arnan et al. | |
| 2003/0149837 A1 | 8/2003 | Coker et al. | |

(Continued)

OTHER PUBLICATIONS

Weil et al.; "CRUSH: Controlled, Scalable, Decentralized Placement of Replicated Data," SC2006 Nov. 2006, Tampa, Florida, USA; 0-7695-2700-0/06, 2006 IEEE.

(Continued)

*Primary Examiner* — David X Yi
*Assistant Examiner* — Arvind Talukdar
(74) *Attorney, Agent, or Firm* — Sheridan Ross P.C.

(57) ABSTRACT

Methods and structure for online migration of data in a storage system comprising a plurality of storage devices. The method comprises redefining a volume of a storage system mapped according to a first mapping structure by defining a second mapping structure. The method further comprises quiescing processing of host I/O requests directed to the volume and transitioning control of the volume from a first to a second volume manager so as to utilize the benefits of the second mapping structure. The method further comprises commencing processing of host I/O requests directed to the volume wherein the volume is mapped according to the second mapping structure. The method further comprises migrating, via the second volume manager, volume data to any of a plurality of storage devices of the system, online, without interrupting processing of host I/O requests directed to the volume. This migrates volume data without significant downtime or wasted space.

20 Claims, 7 Drawing Sheets

(56) References Cited

U.S. PATENT DOCUMENTS

| | | |
|---|---|---|
| 2004/0187131 A1 | 9/2004 | Dageville et al. |
| 2005/0268119 A9 | 12/2005 | Guha et al. |
| 2006/0069886 A1 | 3/2006 | Tulyani |
| 2007/0162692 A1 | 7/2007 | Nishimoto et al. |
| 2007/0266383 A1* | 11/2007 | White .............................. 718/1 |
| 2008/0259710 A1 | 10/2008 | Wenzel et al. |
| 2009/0083483 A1 | 3/2009 | Balakrishnan et al. |
| 2009/0217067 A1 | 8/2009 | Radhakrishnan et al. |
| 2009/0228589 A1* | 9/2009 | Korupolu ..................... 709/226 |
| 2010/0058090 A1 | 3/2010 | Taki et al. |
| 2010/0082729 A1 | 4/2010 | Shitomi |
| 2010/0100677 A1 | 4/2010 | McKean et al. |
| 2010/0115310 A1 | 5/2010 | Kubota et al. |
| 2010/0313045 A1 | 12/2010 | Olarig et al. |
| 2011/0016336 A1 | 1/2011 | Mori et al. |
| 2011/0029729 A1 | 2/2011 | Zwisler et al. |
| 2011/0035547 A1 | 2/2011 | Kidney et al. |
| 2011/0119509 A1 | 5/2011 | Yanagawa et al. |
| 2012/0042034 A1* | 2/2012 | Goggin et al. ................ 709/216 |

OTHER PUBLICATIONS

Weil; "CEPH: Reliable, Scalable, and High-Performance Distributed Storage,"Copyright by Sage A. Weil, 2007.
Colarelli, et al., The Case for Massive Arrays of Idle Disks (MAID), Jan. 7, 2002, Published in: US. cited by other.
Kai, et al., RAID-x: A New Distributed Disk Array for I/O-Centric Cluster Computing Published in Aug. 1, 2000-Aug. 4, 2000 High-Performance Distributed Computing, 2000 Proceedings. The Ninth International Symposium on High-Performance Distributed Computing.

* cited by examiner

METHODS AND STRUCTURE FOR ONLINE MIGRATION OF DATA IN STORAGE SYSTEMS COMPRISING A PLURALITY OF STORAGE DEVICES

BACKGROUND

1. Field of the Invention

The invention relates generally to storage systems, and more specifically relates to methods and structure for online migration of data in storage systems comprising a plurality of storage devices.

2. Related Patents

This patent is related to commonly owned U.S. patent application Ser. No. 12/462,425, filed Aug. 4, 2009, entitled "Method for Optimizing Performance and Power Usage in an Archival Storage System by Utilizing Massive Array of Independent Disks (MAID) Techniques and Controlled Replication Under Scalable Hashing (CRUSH)," which is hereby incorporated by reference.

3. Discussion of Related Art

In traditional storage systems comprising a plurality of storage devices, a system administrator may select a small set of storage devices (for example, five to twenty) upon which to store a logical volume. This logical volume then functions as a single storage space that the system administrator may partition for use by users. For example, many implementations of Redundant Array of Independent Disks (RAID) define one or more logical volumes. In RAID level one, mirroring of data is provided by the use of two or more storage devices to duplicate data. In RAID level five, three or more storage devices are used to distribute data and associated redundancy information. A logical volume may be stored on multiple storage devices as a series of stripes. Stripes are logical sub-volume slices of data that may be concatenated to form host logical volumes. Stripes are stored on extents of storage devices. Extents are contiguous or noncontiguous locations on a storage device.

In newer data distribution techniques, much larger sets of storage devices may be used to store a logical volume. For example, tens to thousands of disks may be used. These newer data distribution techniques may serve to provide, for example, faster recovery from drive failures, greater uniformity of performance across logical volumes, or lower power requirements. For example, implementations of Massive Array of Idle Disks (MAID) may utilize hundreds to thousands of disks. Such MAID implementations may utilize a method known as Controlled Replication Under Scalable Hashing (CRUSH). CRUSH utilizes a hierarchical cluster map representing available storage devices in order to map logical to physical addresses and to permit migration of data. CRUSH provides for a layer of virtualization above and beyond RAID logical volumes, wherein stored data may be migrated to any set of the hundreds to thousands of storage devices. Furthermore, using CRUSH techniques, migration may occur as an online process, without interruption of host I/O requests.

Because newer data distribution techniques provide a variety of favorable advantages over older data distribution techniques, it is desirable to provide methods of upgrading existing storage systems from older to newer data distribution techniques.

Traditionally, several methods have been used to upgrade existing storage systems. In a first method, a system administrator must halt all user applications, back up user data, upgrade the system, and then restore the data onto the upgraded system. One of ordinary skill in the art will appreciate that this process incurs a significant service interruption for users (e.g., "down-time"). For example, the interruption period could take one or more days, during which data on the storage system is inaccessible. Such significant downtime is problematic in many applications where reliable access to data is required.

According to another method of upgrading existing storage systems, a system administrator may update the system infrastructure to support both older and newer data distribution techniques. The system administrator must then define a new logical volume using a set of storage devices having at least the same capacity as the old set of storage devices storing the old logical volume. The new set of storage devices must be distinct from the old set of storage devices. The system administrator then migrates the data from the old storage devices to the new storage devices. Such techniques are undesirable because they require an entirely new set of storage devices to be used for the migration process, and thereby require a great deal of excess capacity within the system.

Thus, it is an ongoing challenge to provide methods and systems for upgrading the operational infrastructure for data distribution of logical volumes in a storage system in a manner that both reduces downtime and is space-efficient.

SUMMARY

The present invention addresses the above and other problems, thereby advancing the state of the useful arts, by providing methods and structure for online migration of data in storage systems comprising a plurality of storage devices. A logical volume is managed by a first volume manager according to a first mapping structure that constrains the logical volume to a fixed subset of disks. The logical volume is redefined according to a second mapping structure, and control of the logical volume is transitioned from the first volume manager to a second volume manager that supports enhanced functionality of the second mapping structure. The second volume manager utilizes the enhanced functionality of the second mapping structure to migrate the data of the logical volume to a new set of disks within the storage system as an online process. Thus, the features and aspects discussed herein allow for migration of data of a volume in a manner that addresses both downtime space-efficiency concerns.

In one aspect hereof, a method, and a computer-readable medium embodying the method, are provided for online migration of data in a storage system comprising a plurality of storage devices. The method comprises controlling, by operation of a first volume manager, a logical volume of the storage system mapped according to a first mapping structure. The first mapping structure constrains the logical volume to a fixed subset of the plurality of storage devices. The method also comprises defining a second mapping structure based on information defining the logical volume. The method further comprises quiescing processing of host I/O requests directed to the logical volume as presently mapped according to the first mapping structure, transitioning control of the logical volume from the first volume manager to a second volume manager, and commencing processing of the host I/O requests directed to the logical volume wherein the logical volume is mapped according to the second mapping structure. The method also comprises migrating, by operation of the second volume manager, data of the logical volume to any of the plurality of storage devices. The migration is performed without interrupting processing of host I/O requests directed to the logical volume.

Another aspect hereof provides a storage controller adapted to be coupled with a plurality of storage devices. The storage controller comprises a first volume manager adapted to be coupled with the plurality of storage devices and further adapted to control operation of a logical volume residing on a fixed subset of the plurality of storage devices according to a first mapping structure. The storage controller further comprises a second volume manager adapted to be coupled with the plurality of storage devices. The storage controller is further adapted to receive host I/O requests directed to the logical volume via a front end logic and route the host I/O requests to one of the first volume manager and second volume manager. The storage controller is adapted to perform these I/O operations at the direction of the first volume manager and second volume manager, via a back end logic communicatively coupled with the plurality of storage devices. The storage controller is also adapted to define a second mapping structure based on information defining the logical volume, quiesce processing of the host I/O requests directed to the logical volume, transition control of the logical volume from the first volume manager to the second volume manager, and commence processing of the host I/O requests under control of the second volume using the second mapping structure. The storage controller is further adapted to migrate data of the logical volume to any of the plurality of storage devices. The migration is performed without interrupting processing of the host I/O requests directed to the logical volume.

DETAILED DESCRIPTION OF THE DRAWINGS

Figure 1A:
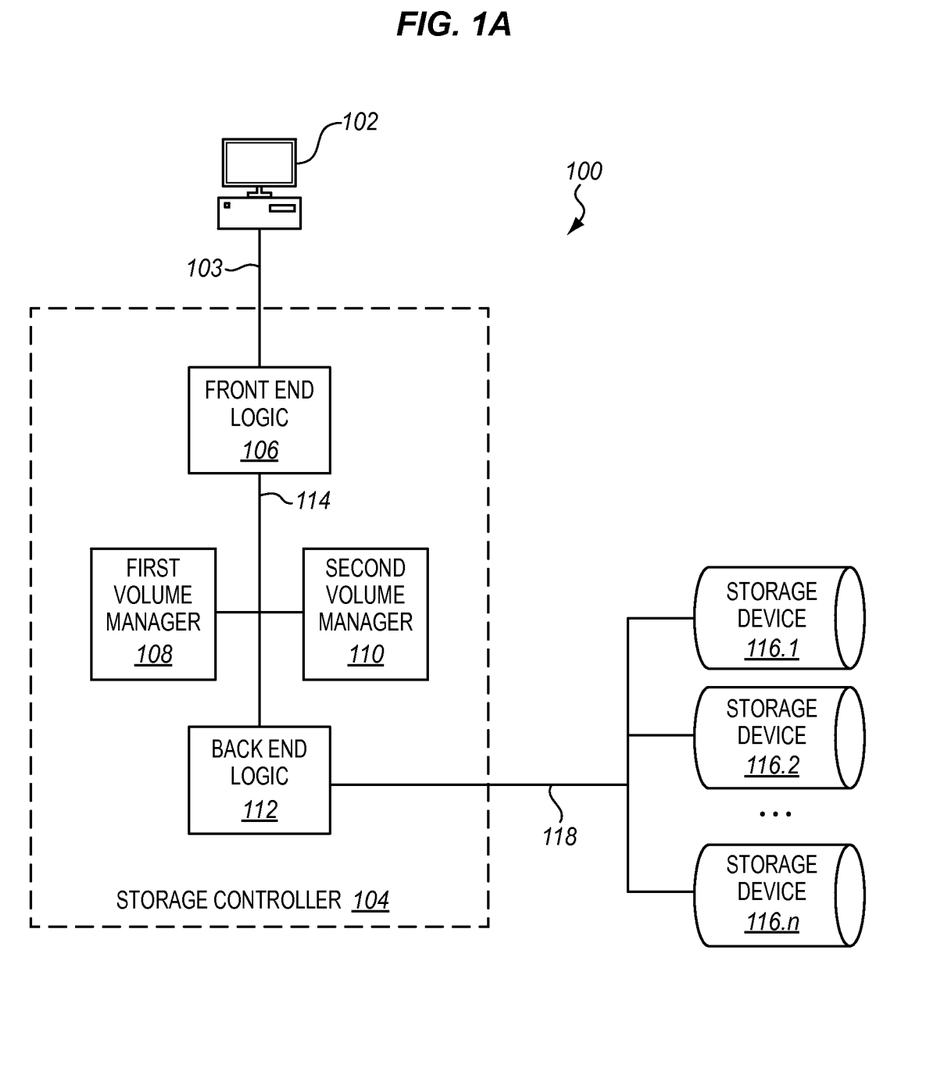
FIG. 1A is a block diagram of an exemplary system enhanced in accordance with features and aspects hereof to provide online migration of data in storage systems comprising a plurality of storage devices.

FIG. 1A is a block diagram of an exemplary system 100 capable of performing online migration of data in a logical volume. System 100 comprises host 102 coupled with storage controller 104 via first communication path 103. Host 102 sends host I/O requests to storage controller 104 that are received by front end logic 106 of storage controller 104 via first communication path 103. Front end logic 106 is communicatively coupled via second communication path 114 with first volume manager 108, second volume manager 110, and back end logic 112, all within storage controller 104. Storage controller 104 is coupled, via third communication path 118 and back end logic 112, to plurality of storage devices 116.1 through 116.n.

In accordance with features and aspects hereof, first volume manager 108 manages one or more logical volumes defined according to a first (i.e., older or legacy) mapping structure while second volume manager 110 manages logical volumes using a second (i.e., newer or upgraded) mapping structure. The first mapping structure may constrain the logical volume to a fixed set of storage devices, while the second mapping structure may allow second volume manager 110 to migrate the logical volume to any subset of plurality of storage devices 116.1 through 116.n coupled with storage controller 104.

Both volume managers are present in the upgraded logic of controller 104. Logical volumes, presently under the control of first (old) volume manager 108 are transitioned to control of second (new) volume manager 110 by system 100. Logical volumes are re-defined in accordance with the second mapping structure of second volume manager 110. The logical volume may be re-defined such that the logical-to-physical mapping of data according to the second mapping structure remains substantially equivalent to the logical-to-physical mapping of data according to the first mapping structure. Once the volume has been defined according to the second mapping structure, control of the logical volume is transitioned to second volume manager 110. Once control is transitioned, second volume manager 110 can take advantage of its enhanced functionality so as to migrate the logical volume across a different set of storage devices as a background task transparent to host 102 and without interruption of processing of I/O requests from host 102 (i.e., "online").

According to features and aspects hereof, front end logic 106 receives a host I/O request directed to a logical volume and forwards the request to the volume manager that presently controls the logical volume. First volume manager 108 is adapted to receive, from front end logic 106, host I/O requests directed to a logical volume mapped according to a first mapping structure. First volume manager 108 is further adapted to process the request and direct back end logic 112 to perform a series of I/O operations accessing some of plurality of storage devices 116.1 through 116.n containing the logical volume. Second volume manager 110 is adapted to process host I/O requests directed to a logical volume mapped according to a second mapping structure. Second volume manager 110 is further adapted to receive a host I/O request from front end logic 106, process the request, and direct back end logic 112 to perform a series of I/O operations accessing the plurality of storage devices 116.1 through 116.n containing the logical volume.

As described herein, a "mapping structure" is a metadata construct or object used by volume managers to define how logical addresses of a logical volume are mapped to physical locations of one or more storage devices. Common mapping structures include the many varieties of protocols governing RAID architecture. In new mapping structures, it may be possible to utilize properties of a given mapping structure so as to perform online migration of data without interruption of host I/O processing. For example, CRUSH provides a mapping structure having a hierarchical cluster map that supports online migration techniques. By transitioning a logical volume from an old mapping structure to a new mapping structure, online migration of data in the logical volume may be beneficially achieved.

Host 102 may comprise any suitable computing device, such as a personal computer, workstation, server, mobile unit, or other device capable of sending host I/O requests directed to a logical volume. Host I/O requests may include read/write requests and any other inquiries or commands directed to the logical volume. A host I/O request may be generated by host 102 and transferred through front end logic 106 to first volume manager 108 or second volume manager 110. The requests are processed by first volume manager 108 or second volume manager 110 to access data on the logical volume by generating lower level I/O operations to perform the requests. I/O operations performed by back end logic 112 may include commands or inquiries directed to specific storage devices, stripes, or extents of storage devices.

Communications paths 103 and 118 may comprise any number of communications media and associated protocols including, for example, Fibre Channel, Ethernet, parallel or serial SCSI, parallel or serial Advanced Technology Attachment (PATA or SATA), USB, IEEE 1384, or any medium capable of propagating and delivering signals from a source to a recipient. Communications path 114 communicatively couples functional elements of storage controller 104. Communications path 114 may include any functional logical communications pathway, where functional modules within controller 104 are implemented as suitably programmed instructions executed by a general or special purpose processor. Communications path 114 may be implemented as any of several well known interprocess software communication techniques. Where functions of controller 104 are implemented as commercially available or custom designed circuits, communication path 114 may be implemented as any of several well known component interconnect structures including, for example, Peripheral Computer Interconnect (PCI) communication structures, processor specific bus structures, and others.

Front end logic 106 comprises logic for receiving and forwarding host I/O requests to the appropriate volume manager. This logic may include, for example, a lookup table, a hashing algorithm, a dynamic search algorithm, or any other suitable methods and structures. Front end logic 106 may forward host I/O requests directed to logical volumes mapped according to the first mapping structure to first volume manager 108, and may forward requests directed to logical volumes mapped according to the second mapping structure to second volume manager 110. Front end logic 106 may determine which volume manager to forward host I/O requests to based upon a listing of logical volumes in the memory of storage controller 104, based upon internal variables, or in response to input from host 102. During transitioning of a logical volume from a first mapping structure to a second mapping structure, front end logic 106 may be adapted to quiesce host I/O requests that would normally be directed to a logical volume under control of first volume manager 108. Upon completion of the transition process, front end logic 106 may forward these host I/O requests to second volume manager 110 now in control of the logical volume. Back end logic 112 may comprise logic for communicating with and commanding storage devices 116.1 through 116.n, and performing I/O operations received from first volume manager 108 and from second volume manager 110.

One of ordinary skill in the art will appreciate that storage devices 116.1 through 116.n may include any number of well known storage technologies including, for example, optical storage (e.g., CD, DVD, etc.), magnetic storage devices (e.g., rotating magnetic disks, etc.), and solid state storage devices (e.g., RAM disks, flash memory, etc.).

Figure 1B:
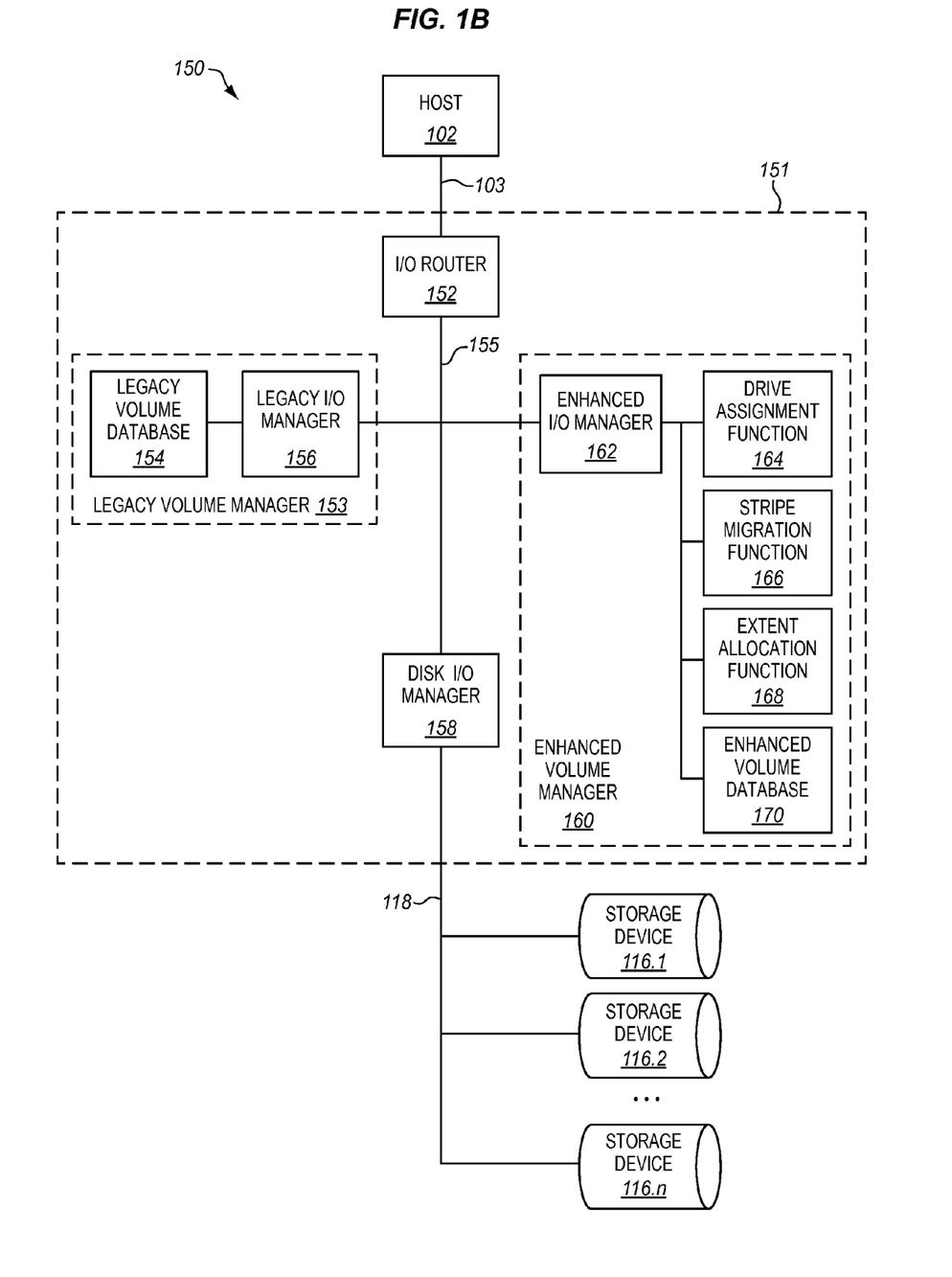
FIG. 1B is a block diagram of a further exemplary system enhanced in accordance with features and aspects hereof to provide online migration of data in storage systems comprising a plurality of storage devices.

FIG. 1B is a block diagram of another exemplary system 150 capable of performing online migration of data in a volume. System 150 comprises host 102, coupled with storage controller 151 via first communication path 103. Storage controller 151 comprises I/O router 152 coupled with communication path 103. I/O router 152 is communicatively coupled via second communication path 155 to legacy volume manager 153, enhanced volume manager 160, and disk I/O manager 158. Legacy volume manager 153 comprises legacy volume database 154 coupled with legacy I/O manager 156. Enhanced volume manager 160 comprises enhanced I/O manager 162 coupled with drive assignment function 164, stripe migration function 166, extent allocation function 168, and enhanced volume database 170. Storage controller 151 is coupled with plurality of storage devices 116.1 through 116.n via communication path 118 and I/O manager 158.

System 150 may redefine a logical volume according to a new mapping structure, and transition control of the logical volume from legacy volume manager 153 to enhanced volume manager 160. The logical volume may be re-defined such that the logical-to-physical mapping of data according to the second mapping structure remains substantially equivalent to the logical-to-physical mapping of data according to the first mapping structure. Once control is transitioned, enhanced volume manager 160 can take advantage of its enhanced functionality so as to migrate the logical volume across a different set of storage devices, without interrupting host I/O requests.

Host 102 sends I/O requests directed to a logical volume via path 103 to storage controller 151. I/O router 152 forwards these host I/O requests to the volume manager that currently controls the logical volume. I/O router 152 may determine which volume manager to forward host I/O requests to based upon a listing of logical volumes in the memory of storage controller 151, based upon internal variables, or in response to input from host 102. During transitioning of a logical volume from a first mapping structure to a second mapping structure, I/O router 152 may be adapted to quiesce host I/O requests that would normally be directed to a logical volume under control of legacy volume manager 153. Upon completion of the transition process, I/O router 152 may forward these host I/O requests to enhanced volume manager 160 now in control of the logical volume. I/O router 152 performs this communication via second communication path 155. If the logical volume is controlled by legacy volume manager 153 then legacy I/O manager 156 receives the host I/O requests directed to the logical volume and determines, by reference to legacy volume database 154, storage devices 116.1 through 116.n targeted by the host I/O requests. Legacy volume manager 153 then contacts disk I/O manager 158 via second communication path 155, and provides disk I/O manager 158 a series of I/O operations to perform upon storage devices 116.1 through 116.$n$. Disk I/O manager 158 then forwards each I/O operation to the storage device 116.1 through 116.$n$ to which the I/O operation is directed, via third communication path 118. Alternatively, if the logical volume is controlled by enhanced volume manager 160 then enhanced I/O manager 162 receives the host I/O requests directed to the logical volume and determines, by reference to enhanced volume database 170, storage devices 116.1 through 116.$n$ targeted by the host I/O requests. Enhanced volume manager 160 then contacts disk I/O manager 158, via second communication path 114, and provides disk I/O manager 158 a series of I/O operations to perform upon the storage devices 116.1 through 116.$n$.

Enhanced volume manager 160 may include a drive assignment function 164 adapted to determine which storage devices 116.1 through 116.$n$ to use to store the logical volume according to a second mapping structure. Enhanced volume manager 160 may include an extent allocation function 168, adapted to select which segments of storage devices 116.1 through 116.$n$ to use to store the logical volume. Additionally, enhanced volume manager 160 may include a stripe migration function 166, adapted to migrate particular stripes of data of the logical volume from one set of storage devices 116.1 through 116.$n$ and extents to a second set of storage devices 116.1 through 116.$n$ and extents.

Communications path 155 communicatively couples functional elements of storage controller 150. Communications path 155 may include any functional logical communications pathway such as a communications protocol.

In certain circumstances, it may be beneficial to "downgrade" a logical volume from a second mapping structure to a first mapping structure. One of ordinary skill in the art will appreciate that the systems described above in regards to FIGS. 1A and 1B may be operable to perform this objective. For example, storage controller 104 may be operable to perform an online migration of data of an upgraded logical volume, mapped according to a second mapping structure, into a constrained subset of plurality of storage devices 116.1 through 116.$n$. This migration may occur while storage controller 104 continues processing of host I/O requests directed to the logical volume. The constrained subset of plurality of storage devices 116.1 through 116.$n$ may be supported by the first mapping structure. Once the data of the logical volume has been migrated to this constrained subset of plurality of storage devices 116.1 through 116.$n$, the system may re-define the upgraded logical volume according to the first mapping structure. The system may further be operable to quiesce host I/O requests directed to the logical volume, and transition control of the logical volume from second volume manager 110 to first volume manager 108. The system may also resume processing of host I/O requests directed to the logical volume under the control of first volume manager 108 according to the first mapping structure.

Those of ordinary skill in the art will recognize numerous additional and equivalent features and modules within fully functional storage controllers 104 and 151 as depicted in FIGS. 1A and 1B described above. Elements of storage controllers 104 and 151 are intended to describe functions performed by these controllers. These functional decompositions represent two possible embodiments of functions of a storage controller. Those of ordinary skill in the art will recognize numerous additional and equivalent elements that may be present in a fully functional controller 104 or 151. Further, the functional elements shown may be implemented as suitable programmed instructions executed by a general or specific purpose processor (not shown) of controller 104 or 151, may be implemented as suitably designed custom circuits (not shown) of controller 104 or 151, or combinations of software and custom circuits. Still further, the elements of storage controllers may be distributed over multiple cooperating controller devices or may all be performed within a single controller device. These and other design choices will be readily apparent to those of ordinary skill in the art.

Figure 2:
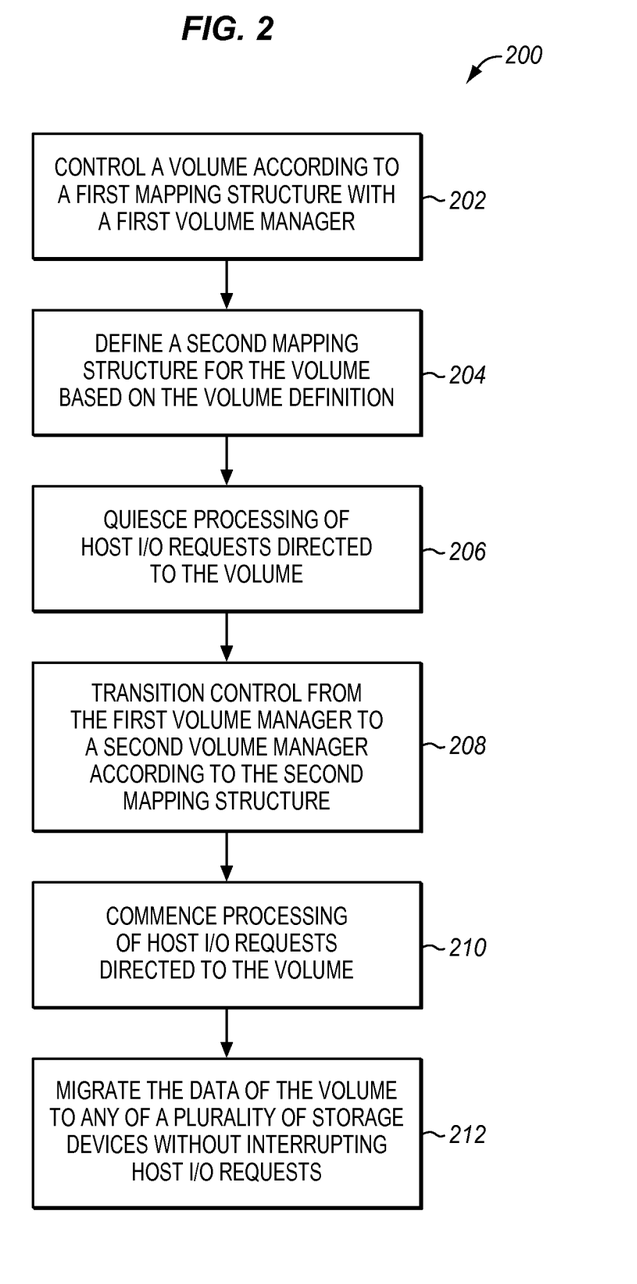
FIG. 2 is a flowchart describing an exemplary method in accordance with features and aspects hereof to provide online migration of data in storage systems comprising a plurality of storage devices.

FIG. 2 is a flowchart illustrating an exemplary method 200 for performing online migration of data residing on a logical volume. Method 200 may be performed, for example, by system 100 of FIG. 1A or system 150 of FIG. 1B to transition control of a logical volume from a first mapping structure (e.g., an old/legacy structure) to a second mapping structure (e.g., a new/upgraded mapping structure), thereby allowing for online migration of the data of the logical volume. At 202, a logical volume is controlled by a first volume manager according to a first mapping structure. This first mapping structure comprises the current mapping of the data and redundancy information of the logical volume. I/O requests are routed to the first volume manager for processing. In 204, the method defines a second mapping structure for the logical volume, based upon the definition of the logical volume. The logical volume may be re-defined such that the logical-to-physical mapping of data according to the second mapping structure remains substantially equivalent to the logical-to-physical mapping of data according to the first mapping structure. The information defining the logical volume may include the storage management technique used to store the data of the logical volume (e.g., RAID management level), the storage devices and extents that store the data of the logical volume, and the size of the logical volume. The second mapping structure comprises support for advanced functionality including online migration processes. Once the logical volume has been defined according to the second mapping structure, 206 quiesces processing of host I/O requests directed to the logical volume. At 208, the method transitions control of the logical volume from the first volume manager to a second volume manager that supports the second mapping structure. At 210, the method commences processing of host I/O requests directed to the logical volume under the control of the second volume manager for processing of host I/O requests. Thus, the logical volume originally mapped in accordance with the first mapping structure is now able to be controlled by the second volume manager. At 212, the data of the logical volume is migrated to any of a plurality of storage devices without interrupting host I/O requests. The migration may be performed by the second volume manager using the second mapping structure.

Quiescing processing of host I/O requests directed to the logical volume, at 206, serves to prevent the logical volume's configuration from being altered while the logical volume is being defined according to the second mapping structure. This reduces the risk of a loss of data integrity. Quiescing comprises a variety of exemplary methods. In one embodiment, quiescing may include queuing incoming commands and completing all in-progress commands associated with the volumes in question. In a further embodiment, quiescing may include blocking, pausing, or interrupting host I/O requests within storage controller that are directed to the logical volume. This quiescing may occur before, during, or after receipt of host I/O requests directed to the logical volume. It is not necessary to quiesce all host I/O requests directed to the storage devices, but rather only host I/O requests that are directed to the logical volume itself.

Transitioning control of the logical volume, at 208, may take place according to a variety of methods. For example, transitioning may simply include altering routing logic such that all I/O requests directed to the logical volume are routed to the second volume manager instead of the first volume manager. In another embodiment, transitioning control may include directing the first volume manager to forward all requests directed to the logical volume to the second volume manager.

Once control of the logical volume has passed to the second volume manager, online migration of the data of the logical volume at 212 may be desirable in order to fully realize the benefits of the second mapping structure. The online migration may include utilizing any of a variety of functions or algorithms supported by the second mapping structure. Migrating may include copying data from an extent of a first storage device, as a background task, to an extent of a second storage device. Migrating may also include deleting the original data from the extent of the first storage device as a background task. One of ordinary skill in the art will further appreciate a variety of techniques by which data of the logical volume, mapped according to the second mapping structure, may be migrated in an online fashion such that host I/O requests are not interrupted. It is not necessary that the host be idle at the time the migration occurs. Semaphores and other well known procedural techniques may assure that data integrity is preserved even while other processes run concurrently with the migration process.

A skilled artisan will appreciate that elements of method 200 may be re-organized to allow a system to "downgrade" a logical volume from the second mapping structure to the first mapping structure. This may be achieved by migrating data of a logical volume (mapped according to the second mapping structure) into a constrained subset of a plurality of storage devices. The migration process may occur while host I/O requests directed to the logical volume continue to be processed. The constrained subset of storage devices may be supported by the first mapping structure. Migration may occur in a similar fashion to that described at 212 of FIG. 2. After migration, quiescing processing of host I/O requests directed to the volume may occur, similar to the process described at 206 of FIG. 2. The method may further comprise transitioning control from the second volume manager to the first volume manager, similar to the process described at 208 of FIG. 2. Further, the method may comprise commencing processing of host I/O requests, similar to the process described at 210 of FIG. 2, but using the first volume manager.

Figure 3:
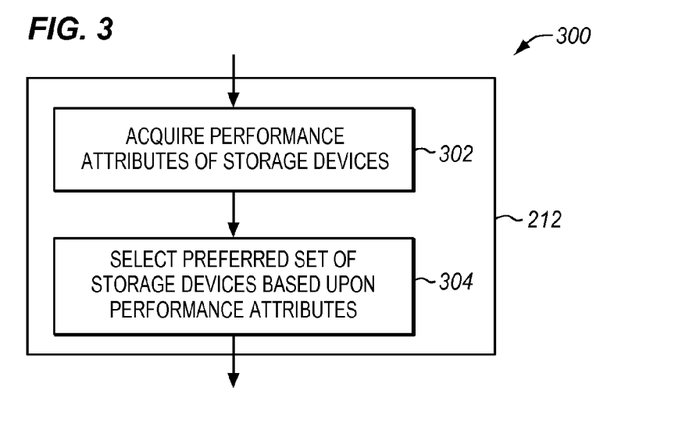
FIGS. 3 through 5 are flowcharts describing exemplary additional details of the method of FIG. 2 in accordance with features and aspects hereof.

FIG. 3 is a flowchart describing exemplary additional details of migrating at 212 of FIG. 2. According to method 300, migrating may include acquiring performance attributes of storage devices 116.1 through 116.n of the system at 302, and may further comprise selecting a preferred set of storage devices from the storage devices 116.1 through 116.n of the system, based upon performance attributes, at 304. For example, if a logical volume contains data that is sensitive to latency or speed, or utilizes applications that are similarly sensitive, it may be desirable to migrate the data of the logical volume to high-performance storage devices. Alternatively, if the data is rarely accessed or has very lax latency requirements, it may be desirable to migrate the data of the logical volume to low-performance storage devices, so as to free up available space on high-performance storage devices. One of ordinary skill in the art will appreciate that performance attributes may include, for example, quality of service characteristics, drive speed, communication bandwidth, mechanical latencies, power consumption, capacity, and many other characteristics.

Figure 4:
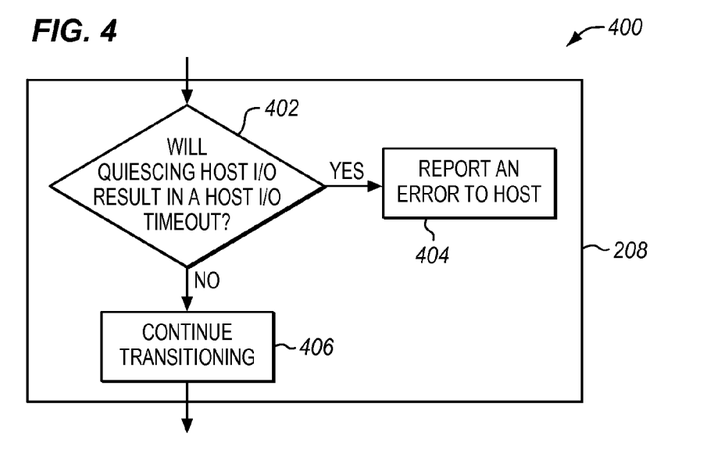

FIG. 4 is a flowchart describing exemplary additional details of transitioning at 208 of FIG. 2. According to method 400, transitioning may include predicting whether quiescing host I/O will unacceptably result in a host I/O timeout that may, for example disrupt an application utilizing the storage system, at 402. If the method predicts that a host I/O timeout will result, the method may further abort the transition process by unblocking the quiesced host I/O requests, and may further report an error to the user, at 404. Alternatively, if no unacceptable interruption of host I/O requests is predicted, the method may continue the transition process, at 406.

Host I/O timeouts include timeouts that may interrupt any of a variety of volume I/O services provided by the storage system to the applications running in the host. For example, these applications could include routine backups performed on the logical volume, programs and services implemented on the host, or diagnostic routines.

The method may perform its prediction process by any number of methods. One of ordinary skill in the art will appreciate that such predictions may be performed by, for example, determining the period of time in which a host I/O timeout will result, determining the number of host I/O requests directed to the logical volume which have already been quiesced, and other methods.

Figure 5:
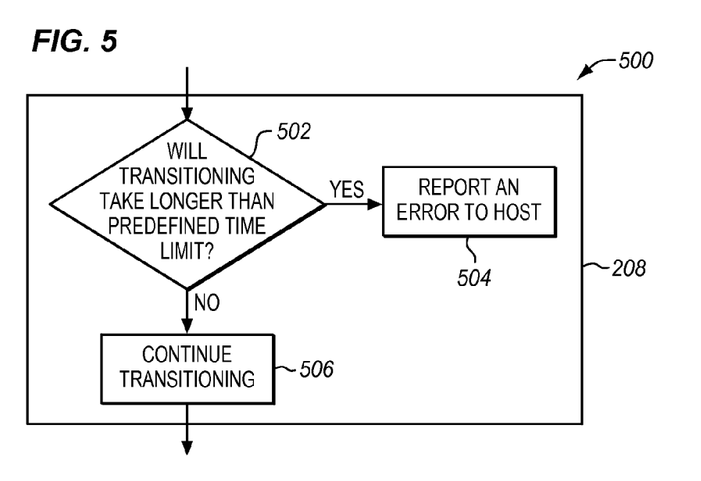

FIG. 5 is a flowchart describing alternative exemplary details of transitioning at 208 of FIG. 2. According to method 500, transitioning may include, for example, predicting whether transitioning will take longer than a predefined time limit, at 502. If the method determines that transitioning will take longer than the predefined time limit, the method may further report an error to a host, or abort the transition process, at 504. Alternatively, if the time limit is not predicted to be reached, the method may continue the transition process, at 506.

The method may perform its prediction process by a number of means, including variations upon the methods described above. Such predictions may be performed by determining whether a specific percentage of a time limit has passed, or by determining the percentage of completion of the transition at a given time, and comparing it to the percentage of the time limit that has passed.

The methods described in FIGS. 4 and 5 may additionally, or alternatively, report an error if a predefined time limit is actually reached or if a host I/O timeout actually results.

Figure 6:
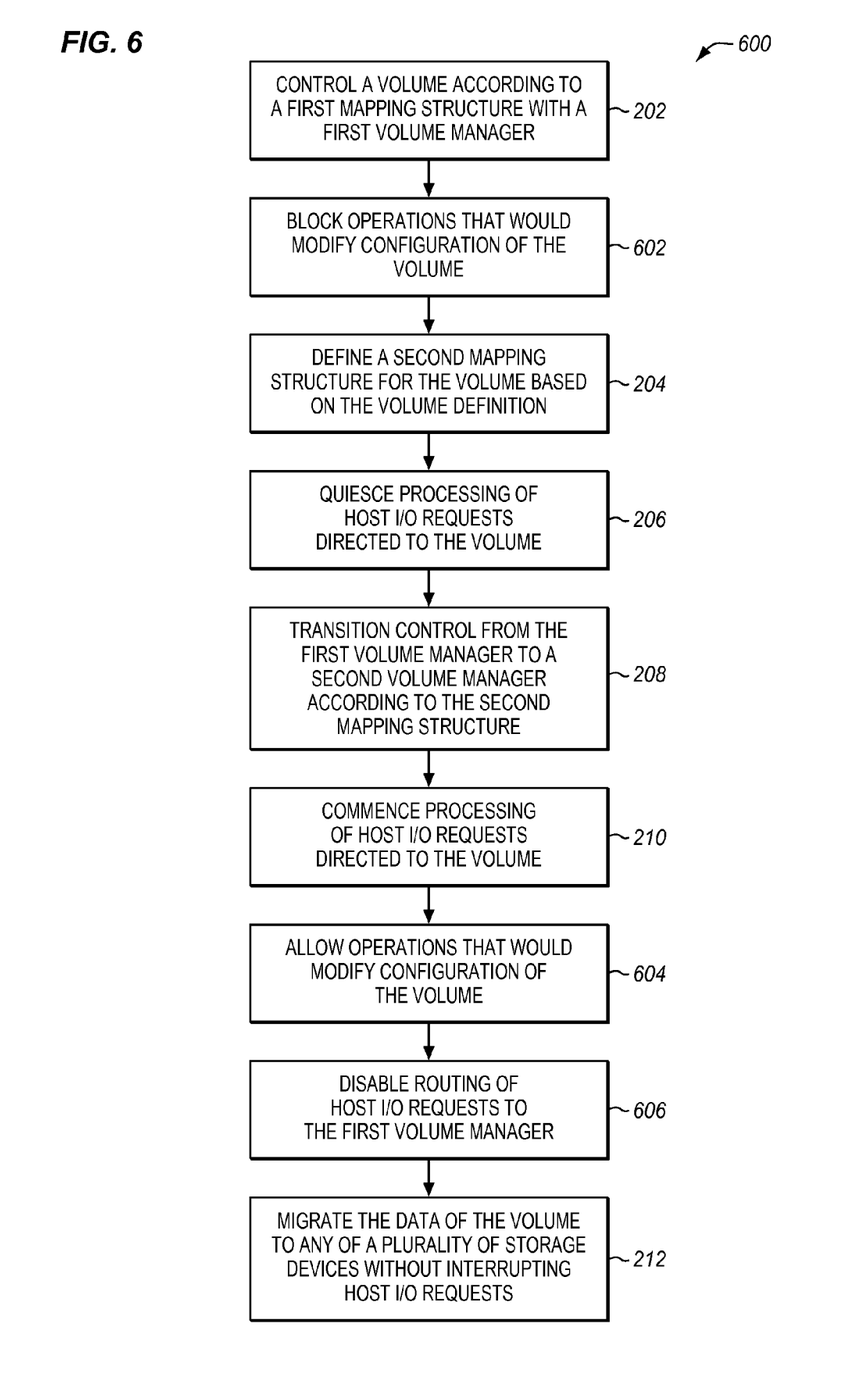
FIG. 6 is a flowchart describing a further exemplary method in accordance with features and aspects hereof to provide online migration of data in storage systems comprising a plurality of storage devices.

FIG. 6 is a flowchart describing an exemplary method 600 for performing online migration of data residing on a logical volume. Method 600 may be performed, for example, by system 100 of FIG. 1A or system 150 of FIG. 1B. In method 600, a logical volume is first controlled according to a first mapping structure at 202, as described above with reference to FIG. 2. The exemplary method comprises blocking operations that would modify configuration of the logical volume at 602, before information defining the logical volume is acquired at 204. This serves to prevent any potential corruption of the logical volume or data stored on the logical volume. After quiescing processing at 206, transitioning control of the logical volume at 208, and commencing processing at 210, all described above with reference to FIG. 2, the exemplary method further comprises allowing operations that would modify the configuration of the logical volume at 604. After the control of the logical volume has been successfully transitioned at 208, the exemplary method may include disabling routing of host I/O requests to the first volume manager at 606 At 212, the method further comprises migrating the data of the volume, as described above with reference to FIG. 2.

One of ordinary skill in the art will appreciate that blocking operations that would modify configuration of the logical volume at 602 may include blocking any operations that would change the definition of the logical volume according to either the first or second mapping structure. Operations changing the definition of the logical volume after the logical volume has been defined according to a second mapping structure, yet before the logical volume has been transitioned to the second volume manager, are undesirable because they may cause a variety of system instabilities. One of ordinary skill in the art will further appreciate that simple read/write requests may not alter the configuration of the logical volume itself, but rather merely modify the data stored on the logical volume. As such, it may not be necessary to block these or similar operations.

It will be appreciated that after all logical volumes originally controlled by the first (old) volume manager have been successfully transitioned from the first volume manager to the second (new) volume manager, the first volume manager may no longer be necessary. As such, it may be desirable to disable the first volume manager at 606. For example, this may occur after control of a logical volume has been successfully transitioned from the first to the second volume manager. Disabling the first volume manager may save system resources including memory and processing power. One of ordinary skill in the art will appreciate that a variety of options may be pursued after control has successfully been transitioned. For example, the method could disable routing of host I/O requests to the first volume manager. This may be desirable because it may speed up processing by front end logic 106 of FIGS. 1A and 1B. In a further example, one could disable or remove the first volume manager and could utilize resources from the first volume manager to enhance performance of the second volume manager. For example, aspects of the first volume manager stored in memory may be deleted. This in turn would provide the second volume manager access to a greater amount of system resources. One of ordinary skill in the art will appreciate various other steps that may be performed at this time.

Those of ordinary skill in the art will readily recognize numerous additional and equivalent steps that may be present in fully functional methods for online migration of data in storage systems comprising a plurality of storage devices. Such additional and equivalent steps are omitted herein for simplicity and brevity of this discussion but will be otherwise readily apparent to those of ordinary skill in the art.

Figure 7:
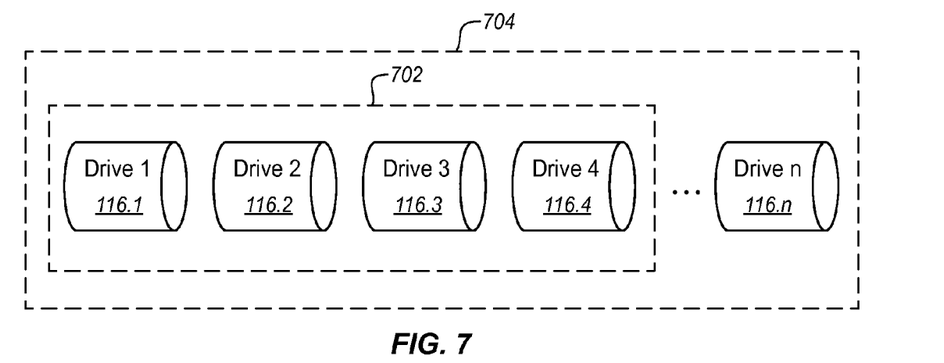
FIG. 7 is a block diagram of an exemplary logical volume mapped according to a first mapping structure, and an exemplary logical volume mapped according to a second mapping structure after the data of the logical volume has been migrated in accordance with features and aspects hereof.

FIG. 7 is a block diagram of an example of a plurality of storage devices 116.1 through 116.n upon which a logical volume is stored. Logical volume 702 is constrained by a first mapping structure to storage devices 116.1 through 116.4. New logical volume 704 is shown after logical volume 702 has been mapped according to a second mapping structure and migrated online, moving the data to occupy any number of storage devices 116.1 through 116.n.

Figure 8:
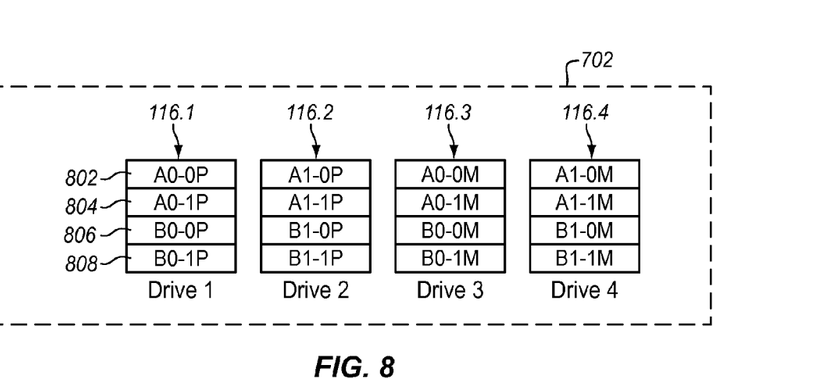
FIG. 8 is a block diagram providing exemplary additional details of the logical volume of FIG. 7 mapped according to a first mapping structure.

FIG. 8 is a block diagram of logical volume 702 constrained to four storage devices, 116.1 through 116.4. In this example, the logical volume is part of a RAID system exhibiting both data striping and data mirroring. In this RAID implementation, data 802, 804, 806, and 808 all reside upon the same storage device 116.1.

Figure 9:
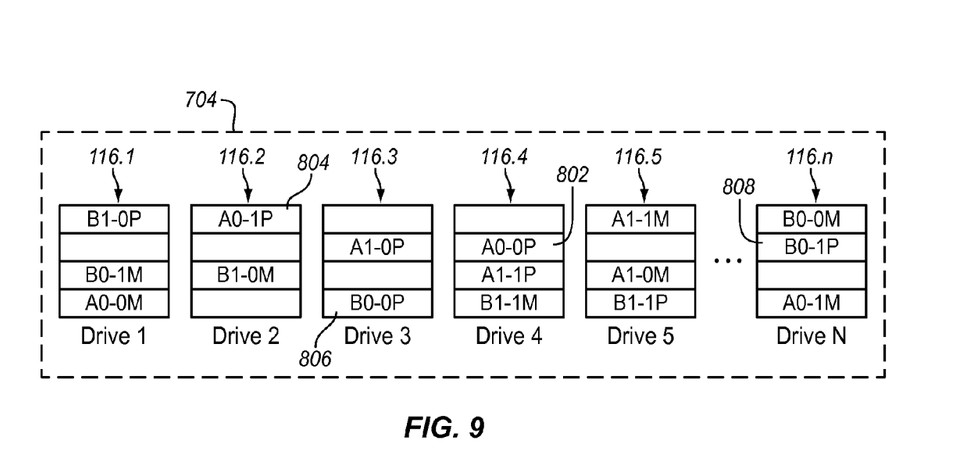
FIG. 9 is a block diagram providing exemplary additional details of the logical volume of FIG. 7 mapped according to a second mapping structure and migrated across a variety of disks.

FIG. 9 is a block diagram of new logical volume 704 that has been defined according to a second mapping structure and then migrated, such that it may be stored on any number of storage devices 116.1 through 116.n. Here, the data stored at 802, 804, 806, and 808 are no longer confined to a single storage device 116.1, but are rather spread across any of the plurality of drives and drive extents of the system. This configuration may, for example, advantageously provide for greater data throughput and redundancy. For example, the configuration of the storage devices according to FIG. 9 may include a MAID architecture.

Figure 10:
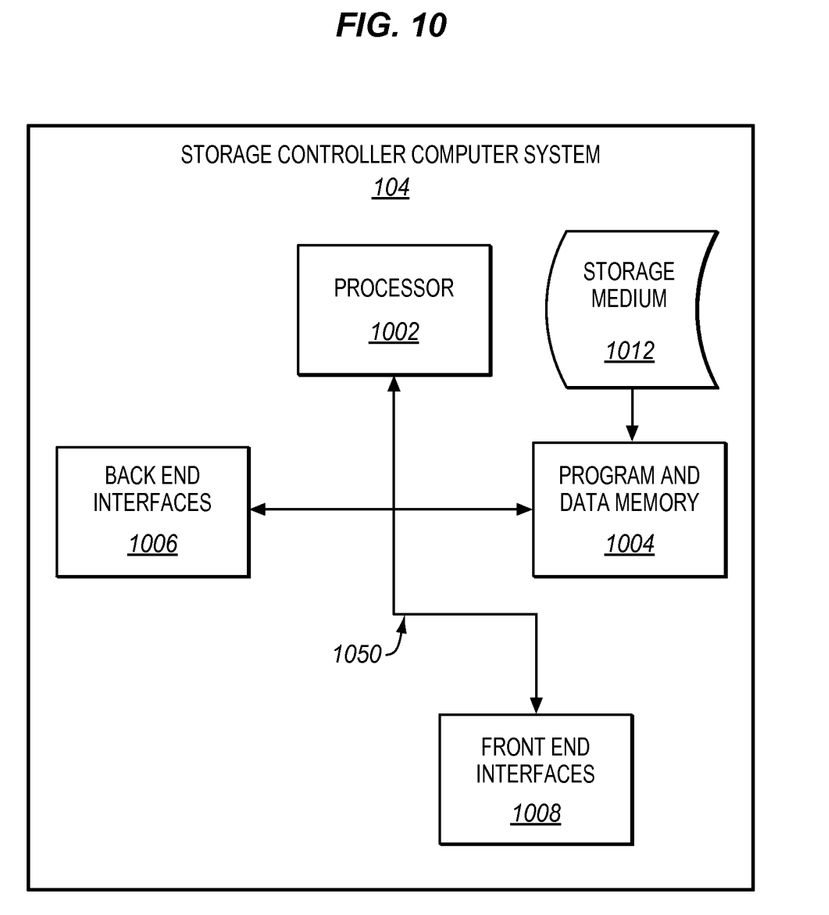
FIG. 10 is a block diagram of a computing system on which a computer readable medium may be used to receive program instructions for implementing methods in accordance with features and aspects hereof.

Embodiments of the invention can take the form of an entirely hardware embodiment, an entirely software embodiment or an embodiment containing both hardware and software elements. In one embodiment, the invention is implemented in software, which comprises but is not limited to firmware, resident software, microcode, etc. FIG. 10 is a block diagram depicting storage controller computer system 104 adapted to provide features and aspects hereof by executing programmed instructions and accessing data stored on a computer readable storage medium 1012 for implementing one or more of the methods depicted herein.

Furthermore, embodiments of the invention can take the form of a computer program product accessible from a computer-usable or computer-readable medium 1012 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Storage controller 104 suitable for storing and/or executing program code will include at least one processor 1002 adapted to be coupled directly or indirectly to memory elements 1004 through a system bus 1050. The memory elements 1004 can include local memory employed during actual execution of the program code, bulk storage, and cache memories, which provide temporary storage of at least some program code in order to reduce the number of times code must be retrieved from bulk storage during execution.

Front end interfaces 1008 and back end interfaces 1006 may be coupled to the processor to enable the storage controller 104 to be coupled with other data processing systems or storage devices through intervening private or public networks. Ethernet cards, Wi-Fi interfaces, Bluetooth Interfaces, are just a few of the currently available types of network or host interface adapters. For example, back end interfaces 1006 may be coupled with plurality of storage devices 116.1 through 116.n, while front end interfaces may be coupled with host 102 via communication path 103.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for online migration of data in a storage system comprising a plurality of storage devices, the method comprising:
controlling, by operation of a first volume manager, a volume of the storage system mapped according to a first mapping structure, wherein the first mapping structure constrains the volume to a fixed subset of the plurality of storage devices;
defining a second mapping structure based on information defining the volume;
quiescing processing of host I/O requests directed to the volume as presently mapped according to the first mapping structure;
transitioning control of the volume from the first volume manager to a second volume manager;
commencing processing of the host I/O requests directed to the volume wherein the volume is mapped according to the second mapping structure; and
migrating, by operation of the second volume manager, data of the volume to any of the plurality of storage devices, wherein the migration is performed without interrupting processing of host I/O requests directed to the volume.

2. The method of claim 1, wherein:
migrating data of the volume further comprises selecting, by operation of the second volume manager, a preferred set of storage devices from the plurality of storage devices on which to store the data of the volume, wherein the preferred storage devices share similar performance attributes.

3. The method of claim 1, wherein:
transitioning further comprises reporting an error if the storage system determines that host I/O requests may not be quiesced without resulting in a host I/O timeout.

4. The method of claim 1, wherein:
transitioning further comprises reporting an error if the storage system predicts the transitioning will take longer than a predefined time limit.

5. The method of claim 1, wherein:
migrating further comprises distributing the data of the volume from the fixed subset of storage devices to a second subset of storage devices wherein the second subset comprises at least one storage device that is not part of the fixed subset.

6. The method of claim 1, wherein:
the method further comprises:
blocking operations that would modify the configuration of the volume prior to defining; and
allowing operations that would modify the configuration of the volume after transitioning.

7. The method of claim 1, wherein:
the method further comprises disabling routing of the host I/O requests to the first volume manager after transitioning the volume.

8. A storage controller adapted to be coupled with a plurality of storage devices, the storage controller comprising:
a first volume manager adapted to be coupled with the plurality of storage devices and further adapted to control operation of a volume residing on a fixed subset of the plurality of storage devices according to a first mapping structure; and
a second volume manager adapted to be coupled with the plurality of storage devices;
wherein the storage controller is adapted to receive host I/O requests directed to the volume via a front end logic and further adapted to route the host I/O requests to one of the first volume manager and second volume manager,
wherein the storage controller is further adapted to perform I/O operations with one or more of the plurality of storage devices at the direction of the first volume manager and second volume manager to process received host I/O requests via a back end logic,
wherein the storage controller is further adapted to define a second mapping structure based on information defining the volume,
wherein the storage controller is further adapted to quiesce processing of the host I/O requests directed to the volume,
wherein the storage controller is further adapted to transition control of the volume from the first volume manager to the second volume manager,
wherein the storage controller is further adapted to commence processing of the host I/O requests under control of the second volume using the second mapping structure,
wherein the second volume manager is adapted to migrate data of the volume to any of the plurality of storage devices,
wherein the migration is performed without interrupting processing of the host I/O requests directed to the volume.

9. The storage controller of claim 8, wherein:
the second volume manager is further adapted to select preferred storage devices from the plurality of the storage devices on which to migrate the data of the volume,
wherein the preferred storage devices share similar performance attributes.

10. The storage controller of claim 8, wherein:
the storage controller is further adapted to report an error if the storage controller determines that host I/O requests may not be quiesced without resulting in a host I/O timeout.

11. The storage controller of claim 8, wherein:
the storage controller is further adapted to report an error if the storage controller predicts that transitioning control of the volume from the first volume manager to the second volume manager will take longer than a predefined time limit.

12. The storage controller of claim 8, wherein:
the second volume manager is further adapted to migrate the volume from the fixed subset of storage devices to a second subset of the plurality of storage devices wherein the second subset comprises at least one storage device that is not part of the fixed subset.

13. The storage controller of claim 8, wherein:
the storage controller is further adapted to block operations that would modify the configuration of the volume before the second mapping structure is defined; and allow operations that would modify the configuration of the volume after control of the volume has been transitioned from the first volume manager to the second volume manager.

14. The storage controller of claim 8, wherein:
the storage controller is further adapted to disable routing of the host I/O requests to the first volume manager after transitioning control of the volume.

15. A non transitory computer readable medium embodying programmed instructions that, when executed by a processor, cause a system to perform a method for online migration of data in a system comprising a plurality of storage devices, the method comprising:
controlling, by operation of a first volume manager, a volume of the storage system mapped according to a first mapping structure, wherein the first mapping structure constrains the volume to a fixed subset of the plurality of storage devices;
defining a second mapping structure based on information defining the volume;
quiescing processing of host I/O requests directed to the volume as presently mapped according to the first mapping structure;
transitioning control of the volume from the first volume manager to a second volume manager;
commencing processing of the host I/O requests directed to the volume wherein the volume is mapped according to the second mapping structure; and
migrating, by operation of the second volume manager, data of the volume to any of the plurality of storage devices, wherein the migration is performed without interrupting processing of host I/O requests directed to the volume.

16. The storage medium of claim 15, wherein:
migrating data of the volume further comprises selecting, by operation of the second volume manager, a preferred set of storage devices from the plurality of storage devices on which to store the data of the volume, wherein the preferred storage devices share similar performance attributes.

17. The storage medium of claim 15, wherein:
transitioning further comprises reporting an error if the storage system determines that host I/O requests may not be quiesced without resulting in a host I/O timeout.

18. The storage medium of claim 15, wherein:
transitioning further comprises reporting an error if the storage system predicts the transitioning will take longer than a predefined time limit.

19. The storage medium of claim 15, wherein:
the method further comprises:
blocking operations that would modify the configuration of the volume prior to defining; and
allowing operations that would modify the configuration of the volume after transitioning.

20. The storage medium of claim 15, wherein:
the method further comprises disabling routing of the host I/O requests to the first volume manager after transitioning the volume.

* * * * *